US008868862B2

(12) United States Patent
Namjoshi et al.

(10) Patent No.: US 8,868,862 B2
(45) Date of Patent: Oct. 21, 2014

(54) METHOD AND APPARATUS FOR SYNCHRONIZATION IN PRIMARY-BACKUP REPLICATION SCHEMES

(75) Inventors: Kedar Namjoshi, Basking Ridge, NJ (US); Pramod Koppol, Manalapan, NJ (US); Athansios Stathopoulos, Jersey City, NJ (US); Gordon T. Wilfong, Bedminster, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 217 days.

(21) Appl. No.: 13/339,497

(22) Filed: Dec. 29, 2011

(65) Prior Publication Data

US 2013/0173876 A1    Jul. 4, 2013

(51) Int. Cl.
*G06F 17/30*    (2006.01)
(52) U.S. Cl.
CPC ..................................... *G06F 17/30* (2013.01)
USPC ......................................................... 711/162
(58) Field of Classification Search
CPC ................... G06F 11/2236; G06F 2212/1008; G06F 11/2094; G06F 12/121; G06F 2201/885; G06F 17/30
See application file for complete search history.

(56) References Cited

U.S. PATENT DOCUMENTS

| 6,453,386 B1* | 9/2002 | Jeffries et al. ................. 711/133 |
| 2003/0204771 A1* | 10/2003 | Johnson et al. ................... 714/5 |
| 2008/0235309 A1* | 9/2008 | Bacon et al. ................... 707/206 |
| 2012/0011422 A1* | 1/2012 | Bertacco et al. .............. 714/799 |
| 2013/0124479 A1 | 5/2013 | Namjoshi et al. |

OTHER PUBLICATIONS

Jun. 26, 2013 The International Search Report and the Written Opinion of the International Searching Authority, or the Declaration in PCT/US2012/065755, 12 pages.

Colesa A et al: Transparent Fault-Tolerance Based on Asynchronous Virtual Machine Replication, Symbolic and Numeric Algorithms for Scientific Computing (SYNASC), 2010 12$^{th}$ International Symposium on, IEEE, Sep. 23, 2010, pp. 442-448, XP031980937, DOI: 10.1109/SYNASC.2010.58 ISBN: 978-1-4244-9816-1.

(Continued)

*Primary Examiner* — Matthew Bradley
*Assistant Examiner* — Candice Rankin
(74) *Attorney, Agent, or Firm* — Wall & Tong, LLP

(57) ABSTRACT

A primary-backup replication capability is disclosed. A primary process and a backup process participate in a synchronization process configured to synchronize state information of the primary and backup processes. The synchronization process operates in periods of time referred to as epochs. During the current epoch, the primary process computes state update information representing changes to the state information of the primary process since a previous epoch, and also buffers output messages generated during the current epoch in an associated output buffer dedicated for use in the current epoch. The primary process initiates a new epoch independent of receiving, from the backup process, a state update acknowledgement for the previous epoch. The output messages buffered for the current epoch are released from the associated output buffer after the primary process receives a state update acknowledgment for the current epoch and all output buffers of all previous epochs are empty.

19 Claims, 5 Drawing Sheets

(56) References Cited

OTHER PUBLICATIONS

Brendan Cully et al: "Remus: High Availability via Asynchronous Virtual Machine Replication," Proceedings of the 5$^{th}$ USENIX Symposium on Networked Systems Design and Implementation, Apr. 16, 2008, pp. 161-174, XP055018714, San Francisco, California Retrieved from the Internet: URL:http://www.usenix.org/event/nsdi08/tech/full_papers/cully/cully.pdf [retrieved on Feb. 8, 2012).
Timothy Wood et al; "PipeCloud," Cloud Computing, ACM, 2 Penn Plaza, Suite 701 New York, NY 10121-0701 USA, Oct. 26, 2011, pp. 1-13, XP058005050, DOI: 10.1145/2038916.2038933 ISBN: 978-1-4503-0976-9.
P. Alsberg and J. D. Day, "A Principle for Resilient Sharing of Distributed Resources," ICSE'76 Proceedings of the 2$^{nd}$ International Conference on Software Engineering, 1976, pp. 562-570.
T. Wood, et al., "PipeCloud: Using Causality to Overcome Speed-of-Light Delays in Cloud-Based Disaster Recovery," SOCC'11, Oct. 27-28, 2011, Cascais, Portugal, pp. 1-13.
P. Barham, et al., "Xen and the Art of Virtualization," SOSP '03: Proceedings of the Nineteenth ACM Symposium on Operating Systems Principles, Bolton Landing, NY, Oct. 19-22, 2003, pp. 164-177.
T. C. Bressoud and F. B. Schneider, "Hypervisor-Based Fault-Tolerance," ACM Transactions on Computer Systems, vol. 14, No. 1, Feb. 1996, pp. 80-107.
D. Farinacci, et al., "Generic Routing Encapsulation (GRE)," Network Working Group Request for Comments 2784, Mar. 2000, pp. 1-9.
G. Dommety, "Key and Sequence Number Extensions to GRE," Network Working Group Request for Comments 2890, Sep. 2000, pp. 1-7.
Standard Performance Evaluation Corporation, "SPECweb2005," http://www.spec.org/web2005/, printed May 21, 2013, pp. 1-3.
"Verizon IP Latency Statistics—Verizon Enterprise Solutions," http://www.verizonenterprise.com/about/network/latency/, printed May 21, 2013, pp. 1-5.
S. Hemminger, "Network Emulation with NetEm," Apr. 2005, pp. 1-9.
Dell, "DVD Store—TechCenter Extras—Wiki—TechCenter Extras—Dell Community," http://en.community.dell.com/techcenter/extras/w/wiki/dvd-store.aspx, printed May 21, 2013.
C. Clark, et al., "Live Migration of Virtual Machines," Proceedings of the 2$^{nd}$ Conference on Symposium on Networked Systems Design & Implementation, vol. 2, USENIX Association, Berkeley, CA, USA, 2005, pp. 275-286.
B. Cully, et al., "Remus: High Availability via Asynchronous Virtual Machine Replication," NSDI'08: 5th USENIX Symposium on Networked Systems Design and implementation, USENIX Association, San Francisco, CA, 2008, pp. 161-174.
G. W. Dunlap, et al., "ReVirt: Enabling Intrusion Analysis Through Virtual-Machine Logging and Replay," Proceedings of the 5$^{th}$ Symposium on Operating Systems Design & Implementation, OSDI'02, Boston, MA, Dec. 9-11, 2002, pp. 211-224.
P. Koppol, et al., "Brief Announcement: The Inherent Difficulty of Timely Primary-Backup Replication," PODC'11, San Jose, CA, Jun. 6-8, 2011, pp. 349-350.
L. Lamport, "Proving the Correctness of Multiprocess Programs," IEEE Transactions on Software Engineering, vol. SE-3, No. 2, Mar. 1977, pp. 125-143.
U. F. Minhas, et al., "RemusDB: Transparent High Availability for Database Systems," Proceedings of the VLDB Endowment, vol. 4, No. 11, Sep. 3, 2011, pp. 1-11.
R. H. Patterson, et al., "SnapMirror: File System Based Asynchronous Mirroring for Disaster Recovery," FAST '02: Proceedings of the 1$^{st}$ USENIX Conference on File and Storage Technologies, USENIX Association, Monterey, CA, Jan. 28-30, 2002, pp. 117-129.
P. Reisner and L. Ellenberg, "DRBD v8—Replicated Storage with Shared Disk Semantics," Proceedings of the 12$^{th}$ International Linux System Technology Conference, Aug. 26, 2007, pp. 1-11.
D. J. Scales, et al., "The Design of a Practical System for Fault-Tolerant Virtual Machines," ACM SIGOPS Operating Systems Review, vol. 44, Issue 4, Dec. 2010, pp. 30-39.
J. Skoglund, et al., "Springer Handbook of Speech Processing," Chapter 15: Voice over IP: Speech Transmission Over Packet Networks, Springer 2007, pp. 307-330.
R. Strom and S. Yemini, "Optimistic Recovery in Distributed Systems," ACM Transactions on Computer Systems, vol. 3, No. 3, Aug. 1985, pp. 204-226.
R. van Renesse and F. B. Schneider, "Chain Replication for Supporting High Throughput and Availability," OSDI'04: Proceedings of the 6$^{th}$ Conference on Symposium on Operating Systems Design & Implementation, vol. 6, pp. 91-104.
AT&T, "Global IP Network Latency," http://ipnetwork.bgtmo.ip.att.net/pws/network_delay.html printed May 21, 2013.
H. Schulzrinne, et al., "RTP: A Transport Protocol for Real-time Applications," Network Working Group Request for Comments 1889, Jan. 1996, pp. 1-75.

* cited by examiner

METHOD AND APPARATUS FOR SYNCHRONIZATION IN PRIMARY-BACKUP REPLICATION SCHEMES

TECHNICAL FIELD

This case relates generally to providing synchronization in primary-backup replication schemes.

BACKGROUND

Cloud computing is changing the ways in which computing services are provided. In order to take full advantage of the capabilities of a data center, many services are designed to scale with load and to be tolerant to faults. A number of services (e.g., interactive services such as telecommunications, gaming, and the like), have relatively tight limits on network performance parameters such as delay and jitter. These criteria—elasticity, fault-tolerance, and network performance—can conflict in many different ways. While there are various fault-tolerance mechanisms which add fault-tolerance to processes, such fault-tolerance is typically added at the expense of incurring network overhead. One such fault-tolerance mechanism is primary-backup replication, in which the state of a primary process is synchronized with the state of a backup process so that the backup process can take over for the primary process after a failure of the primary process. Disadvantageously, however, in many existing primary-backup replication schemes, including those that allow recovery of both memory and disk, regular synchronization between the primary process and the backup process adds delay at least equal to the round-trip delay between the primary process and the backup process. This seriously degrades the network performance of latency-sensitive services.

SUMMARY

Various deficiencies in the prior art are addressed by embodiments for providing primary-backup replication.

In at least some embodiments, a primary process and a backup process participate in a synchronization process configured to synchronize state information of the primary process with state information of the backup process. The synchronization process operates in periods of time referred to as epochs. For each epoch, an associated output buffer is allocated for use in buffering output messages generated during the epoch. During the current epoch, the primary process computes state update information representing changes to the state information of the primary process since the previous epoch. During the current epoch, the primary process also buffers output messages generated during the current epoch in an associated output buffer dedicated for use in the current epoch. The primary process initiates a new epoch independent of receiving, from the backup process, a state update acknowledgement for the previous epoch. The output messages buffered for the current epoch are released from the associated output buffer after the primary process receives a state update acknowledgment for the current epoch and all output buffers of all previous epochs are empty.

In one embodiment, an apparatus is configured to synchronize state between a primary process and a backup process. The apparatus includes a processor and at least one memory. The at least one memory is configured to maintain a plurality of output buffers associated with a respective plurality of epochs of a synchronization process configured to synchronize state information of the primary process with state information of the backup process. The processor configured to, during a current epoch, compute state update information for the current epoch where the state update information represents changes to the state information of the primary process since a previous epoch and buffer output messages generated during the current epoch in the output buffer associated with the current epoch. The processor also is configured to initiate a new epoch independent of receiving, from the backup process, a state update acknowledgement for the previous epoch acknowledging receipt by the backup process of state update information determined by the primary process during the previous epoch.

In one embodiment, a method is provided for synchronizing state between a primary process and a backup process. The method uses a processor and at least one memory. During a current epoch of a synchronization process configured to synchronize state information of a primary process with state information of a backup process, state update information is computed for the current epoch where the state update information represents changes to the state information of the primary process since a previous epoch, and output messages generated during the current epoch are buffered in an output buffer associated with the current epoch. A new epoch is initiated independent of receiving, from the backup process, a state update acknowledgement for the previous epoch acknowledging receipt by the backup process of state update information determined by the primary process during the previous epoch.

In one embodiment, a computer-readable storage medium stores instructions which, when executed by a computer, cause the computer to perform a method for synchronizing state between a primary process and a backup process. During a current epoch of a synchronization process configured to synchronize state information of a primary process with state information of a backup process, state update information is computed for the current epoch where the state update information represents changes to the state information of the primary process since a previous epoch, and output messages generated during the current epoch are buffered in an output buffer associated with the current epoch. A new epoch is initiated independent of receiving, from the backup process, a state update acknowledgement for the previous epoch acknowledging receipt by the backup process of state update information determined by the primary process during the previous epoch.

BRIEF DESCRIPTION OF THE DRAWINGS

The teachings herein can be readily understood by considering the following detailed description in conjunction with the accompanying drawings, in which.

DETAILED DESCRIPTION

In general, a primary-backup replication capability is depicted and described herein, although various other capabilities also may be presented herein.

Although primarily depicted and described with respect to use of embodiments of the primary-backup replication capability to provide checkpoint-based primary-backup replication (denoted herein as an Asynchronous Pipelined Checkpointing primary-backup replication scheme), it is noted that various embodiments of the primary-backup replication capability also may be used to provide primary-backup replication for event-based primary-backup replication (e.g., primary-backup replication based on non-deterministic events such as inputs, interrupts, and the like).

Figure 1:
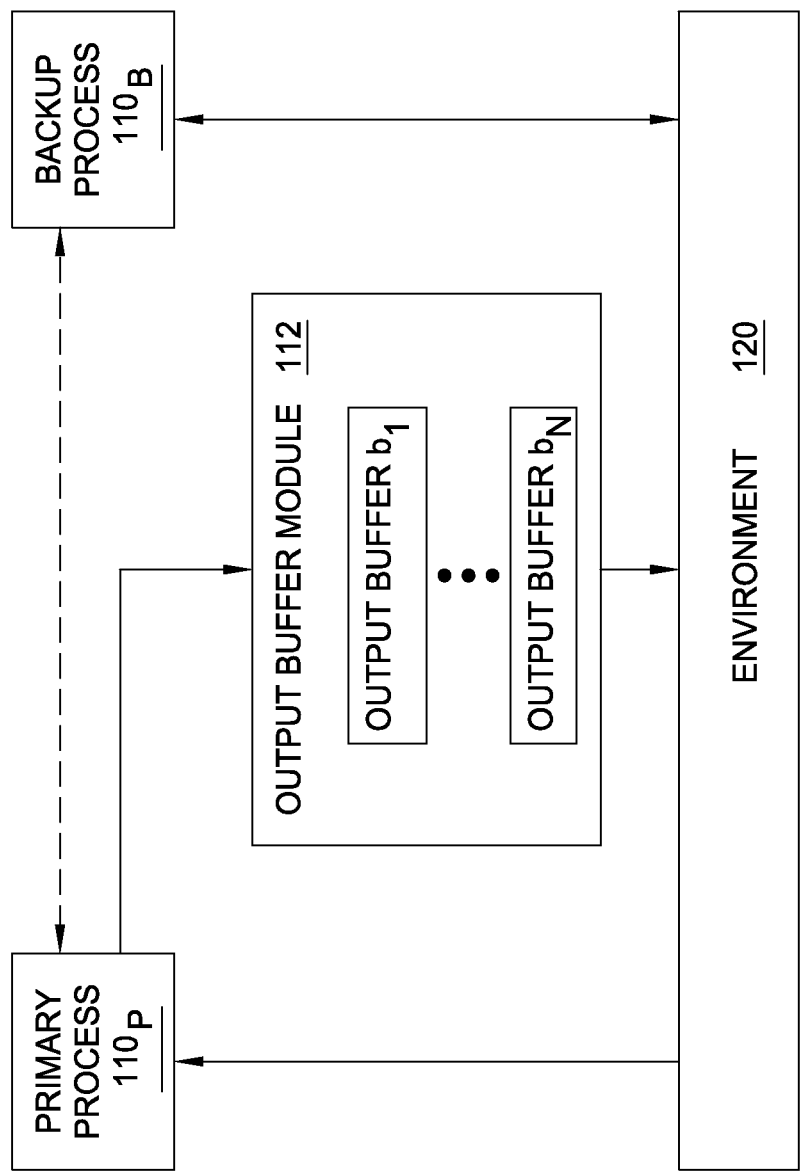
FIG. 1 depicts a high-level block diagram of a system configured to support an Asynchronous Pipelined Checkpointing primary-backup replication scheme.

FIG. 1 depicts a high-level block diagram of a system configured to support an Asynchronous Pipelined Checkpointing primary-backup replication scheme.

As depicted in FIG. 1, system 100 includes a primary process $110_P$ and a backup process $110_B$ (collectively, processes 110), and an associated environment 120. As further depicted in FIG. 1, the primary process has an output buffer module 112 associated therewith.

The primary process $110_P$ is configured to interact with environment 120. The primary process $110_P$ is configured to receive input messages from the environment 120 and process the received input messages. The primary process $110_P$ is configured to generate output messages (e.g., based on local processing independent of the input messages received by primary process $110_P$ and/or based on processing of the input messages received by primary process $110_P$) and provide the output messages to environment 120. The primary process $110_P$ is configured to buffer the generated output messages using the output buffer module 112. The output buffer module 112 (and its associated output buffers $b_1$-$b_n$) may be implemented in any suitable manner (e.g., using separate queues for the respective buffers, using a single queue including queue markers to distinguish the respective output buffers, and the like). The primary process $110_P$ also may be configured to use one or more input buffers (omitted for purposes of clarity) for buffering receive input messages. It is noted that communication between primary process $110_P$ and environment 120 is bidirectional (which, although represented using two different communication paths for inputs to primary process $110_P$ and outputs from primary process $110_P$ in order to better illustrate output buffer module 112, may be provided in any suitable manner).

The backup process $110_B$ is configured to back up primary process $110_P$. The backup process $110_B$ is configured to function as the active process when the primary process $110_P$ fails. The backup process $110_B$, when active, is configured to operate in a manner similar to that of the primary process $110_P$, as described above. It is noted that, when backup process $110_B$ is active, communication between backup process $110_B$ and environment 120 is bidirectional (which, although represented using one communication path for both inputs to backup process $110_B$ and outputs from backup process $110_B$, may be provided in any suitable manner).

In order for the backup process $110_B$ to assume the role of the active process when the primary process $110_P$ fails, the primary process $110_P$ and the backup process $110_B$ need to be synchronized. Accordingly, checkpoint-based synchronization is performed to periodically synchronize the state of the backup process $110_B$ to match the state of the primary process $110_P$. The synchronization of state between primary process $110_P$ and backup process $110_B$ includes synchronization of disk state and memory state. It is noted that, in order to ensure consistency of both disk state and memory state between the primary process $110_P$ and the backup process $110_B$, the primary process $110_P$ and backup process $110_B$ need to be synchronized before the network output upon which the state information is based can be released by primary process $110_P$ to the environment 120. In one embodiment, synchronization is performed using an Asynchronous Pipelined Checkpointing primary-backup replication scheme, which is depicted and described herein with respect to FIGS. 2-4.

The processes 110 may include any suitable types of processes for which primary-backup replication may be used, such as applications, Virtual Machines (VM) in a cloud computing environment, and the like. It is noted that communication between the processes 110 for purposes of exchanging state information and associated state information acknowledgments may be provided in any suitable manner. For example, communication between the processes 110 may be via internal communications within a device where both processes 110 are implemented within a single physical device (illustratively, using the dashed line between primary process $110_P$ and backup process $110_B$). For example, communication between the processes 110 may be via a communication network where the processes 110 are running on different physical devices (illustratively, via environment 120 and/or any other suitable environment or network). Although omitted for purposes of clarity, it will be appreciated that processes 110 may be running on one or more physical machines having various processors and memories (and optionally, various other hardware and software) associated therewith.

The environment 120 may include any suitable type of environment, such as a communications network or other type of environment. Although omitted for purposes of clarity, it will be appreciated that the environment 120 may include various nodes with which the primary process $110_P$ (and, when active, the backup process $110_B$) may exchange various types of messages. For example, primary process $110_P$ (and, when active, backup process $110_B$) may receive and process various types of input messages from environment 120 and, similarly, primary process $110_P$ (and, when active, backup process $110_B$) may generate and propagate various types of output messages to the environment 120.

Figure 2:
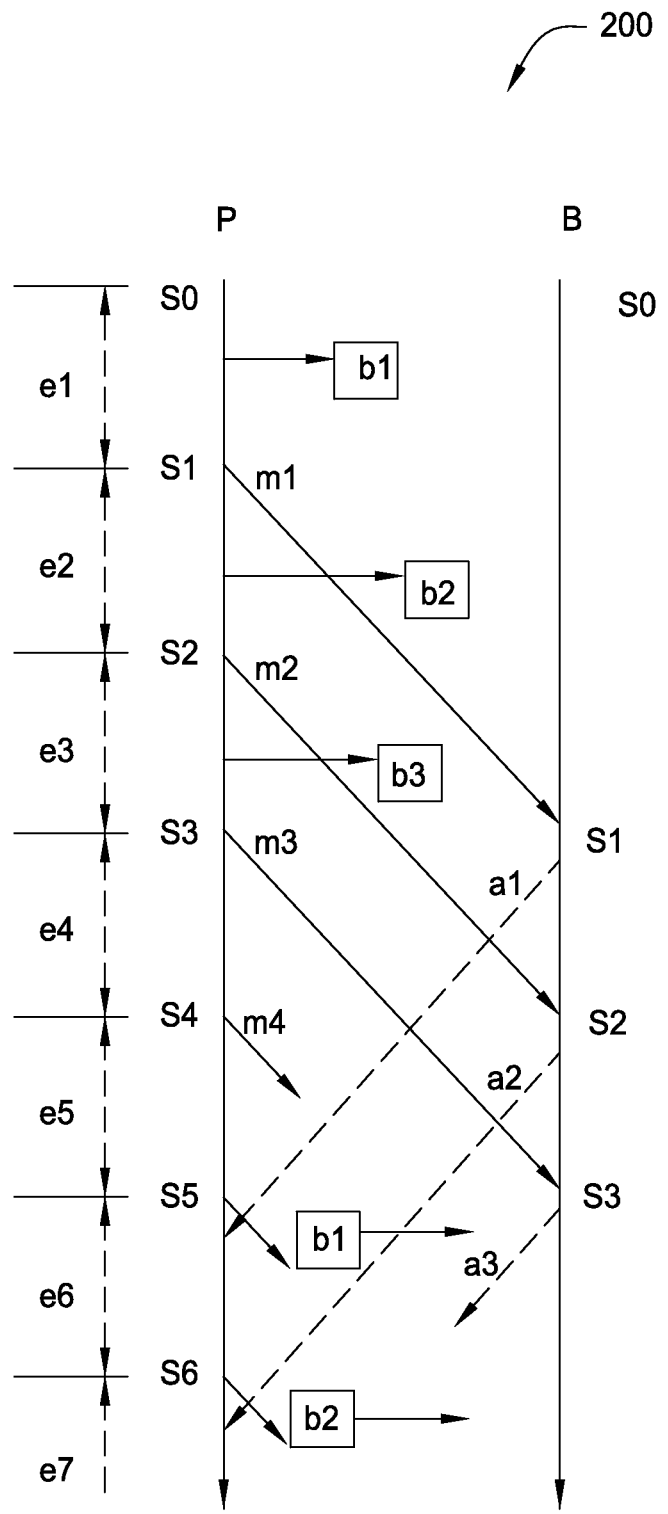
FIG. 2 depicts an exemplary operation diagram of the Asynchronous Pipelined Checkpointing primary-backup replication scheme within the system of FIG. 1.

FIG. 2 depicts an exemplary operation diagram of the Asynchronous Pipelined Checkpointing primary-backup replication scheme within the system of FIG. 1.

As depicted in exemplary operation diagram 200 of FIG. 2, primary process $110_P$ (denoted as P) and backup process $110_B$ (denoted as B) interact for synchronizing state between primary process $110_P$ and backup process $110_B$.

The primary process $110_P$ operates within periods of time denoted as epochs (illustratively, $e_i$ is used to indicate the $i^{th}$ epoch).

A current epoch $e_i$ is initiated at any time after the end of a previous epoch $e_{i-1}$ (which also may be referred to herein as the preceding epoch) and, similarly, a new epoch $e_{i+1}$ (which also may be referred to herein as the next epoch) is initiated at any time after the end of a current epoch $e_i$.

Within a current epoch $e_i$, primary process $110_P$ performs operations (i.e., operations of primary process $110_P$) which may result in changes to its state information. The primary process $110_P$ determines state update information for backup process $110_B$ (illustratively, $m_i$ is used to indicate the current state update information computed by primary process $110_P$ for backup process $110_B$ during current epoch $e_i$). The current state update information $m_i$ determined by primary process $110_P$ during the current epoch $e_i$ represents changes to the state of primary process $110_P$ (and, thus, the differences between the state of primary process $110_P$ and the state of backup process $110_B$) since the previous state update information $m_{i-1}$ was determined by primary process $110_P$ during the previous epoch $e_{i-1}$. The primary process $110_P$ may compute the current state update information $m_i$ contemporaneously with performing its operations during current epoch $e_i$ or after completing its operations during current epoch $e_i$.

Within a current epoch $e_i$, primary process $110_P$ also may generate output messages intended to be provided to the environment within which primary process $110_P$ operates. The primary process $110_P$ may generate the output messages in any suitable manner. For example, primary process $110_P$ may generate output messages based on local processing at primary process $110_P$ that is performed independent of any input messages received at primary process $110_P$. For example, primary process $110_P$ may receive input messages, process the input messages, and produce associated output messages. It is noted that processing of input messages and generation of output messages may be considered to be part of the operations performed by primary process $110_P$. The output messages generated during current epoch $e_i$ are stored in an associated output buffer dedicated for current epoch $e_i$ (illustratively, $b_i$ is used to indicate the $i^{th}$ output buffer for the $i^{th}$ epoch).

The primary process initiates a new epoch $e_{i+1}$ at any time after the end of the current epoch $e_i$. The primary process $110_P$ may then begin performing its functions for the new epoch $e_{i+1}$ (which is now the current epoch for the primary process $110_P$). Namely, the primary process $110_P$ may perform its operations, compute the new state update information $m_{i+1}$ for the new epoch $e_{i+1}$, generate and buffer output messages during the new epoch $e_{i+1}$, and the like. It is noted that the primary process $110_P$ initiates the new epoch $e_{i+1}$ independent of (1) receipt of any state update acknowledgement from backup process $110_B$ indicating that backup process $110_B$ has received and applied associated state update information for any previous epoch, (2) sending of the state update information for the current epoch $e_i$ toward backup process $110_B$, and (3) receipt of a state update acknowledgement from backup process $110_B$ indicating that backup process $110_B$ has received and applied the state update information for the current epoch $e_i$. It is further noted that, since initiation of the new epoch $e_{i+1}$ independent of receipt of any present or past state update acknowledgments, the primary process can continue to initiate new epochs and send the state update information for the new epochs without any constraint on the number of epochs which may be pending at any given time. The primary process $110_P$ continues in this manner for consecutive epochs.

The primary process $110_P$ sends the current state update information determined during the current epoch $e_i$ to the backup process $110_B$ (illustratively, $m_i$ is used to indicate the current state update information sent from the primary process $110_P$ to backup process $110_B$). The primary process $110_P$ may send the current state update information $m_i$ for the current epoch $e_i$ to the backup process $110_B$ independent of initialization of the next epoch $e_{i+1}$. In one embodiment, for example, the primary process $110_P$ may send the current state update information $m_i$ for the current epoch $e_i$ to the backup process $110_B$ during the current epoch $e_i$ (e.g., where the current state update information $m_i$ is pushed out by the primary process $110_P$ toward the backup process $110_B$ during the current epoch $e_i$ but not necessarily received by the backup process $110_P$ during the current epoch $e_i$). In one embodiment, for example, the primary process $110_P$ may send the current state update information $m_i$ for the current epoch $e_i$ to the backup process $110_B$ during the next epoch $e_{i+1}$ (e.g., where the current state update information $m_i$ is pushed out by the primary process $110_P$ toward the backup process $110_B$ after the current epoch $e_i$ has ended). It is noted that a combination of such embodiments also may be supported (e.g., where the pushing of current state update information $m_i$ by the primary process $110_P$ toward the backup process $110_B$ occurs during both the end of the current epoch $e_i$ and the beginning of the next epoch $e_{i+1}$). The state update information may be sent from primary process $110_P$ to backup process $110_B$ in any suitable manner (e.g., using one or more messages transmitted via any suitable communications medium).

The backup process $110_B$, independent of the epochs of the primary process $110_P$, receives the state update information $m_i$ sent by the primary process $110_P$ for epoch $e_i$, updates its state information based on the state update information $m_i$ received from primary process $110_P$, and sends an associated state update acknowledgment to primary process $110_P$ (illustratively, $a_i$ is used to indicate the state update acknowledgement sent from backup process $110_B$ to primary process $110_P$ corresponding to state update information $m_i$ of epoch $e_i$). The state update acknowledgement may be sent from backup process $110_B$ to primary process $110_P$ in any suitable manner (e.g., using any suitable type of message transmitted via any suitable communications medium). The primary process $110_P$ releases the output messages from output buffer $b_i$ of epoch $e_i$ after (1) receiving state update acknowledgment $a_i$ from backup process $110_B$ for epoch $e_i$ and (2) all output messages for all epochs prior to epoch $e_i$ have been released from their associated output buffers to environment 120.

It is noted that, although the primary process $110_P$ is no longer operating within the epoch $e_i$ at the time that the output messages are released from output buffer $b_i$ of epoch $e_i$ to environment 120, the epoch $e_i$ is still considered to be pending at the primary process $110_P$ until the output messages are released from output buffer $b_i$ of the epoch $e_i$ to environment 120. Thus, as noted above, primary process $110_P$ is configured to monitor for the conditions under which the output messages of epoch $e_i$ to may be released from the output buffer $b_i$ of epoch $e_i$ to environment 120 (e.g., monitoring for receipt of the state update acknowledgment $a_i$ from backup process $110_B$ for epoch $e_i$, and monitoring the current status of the output buffers of prior epochs for detecting when all output messages for all epochs prior to epoch $e_i$ have been released from their associated output buffers to environment 120.

A buffer $b_i$ is instantiated for each epoch $e_i$, for storing the output messages generated during the epoch $e_i$ and, similarly, a buffer $b_i$ of an epoch $e_i$ is terminated after the output messages have been released from the buffer $b_i$. Thus, each buffer exists for a particular length of time (i.e., from the beginning of its associated epoch until the output messages have been released from the output buffer of the associated epoch) and only a certain number of buffers will exist at any given time.

As noted above, each buffer exists for a particular length of time and, thus, a bound on the number of pending buffers may be computed as follows. First, it is noted that, if an epoch $e_i$ is considered to be pending when $e_i$ is the current epoch or when primary process $110_P$ is still awaiting state update acknowledgment $a_i$ from backup process $110_B$, then one buffer b must exist per pending epoch e. Second, denote the time between the end of an epoch $e_i$ and the time that the primary process $110_P$ receives associated state update acknowledgment $a_i$ from backup process $110_B$ as T (which may be thought of, roughly, as the round-trip time between primary process $110_P$ and backup process $110_B$). Third, let |epoch| denote the length (in time) of an epoch. If k is such that (k−1)|epoch|≥T, then there will be, at most, k pending epochs and, therefore, k buffers will be sufficient. Thus, the Asynchronous Pipelined Checkpointing primary-backup replication scheme may be denoted using the notation $APC_n$, where n denotes the number of unacknowledged checkpoints (n=k−1).

The operation of the Asynchronous Pipelined Checkpointing primary-backup replication scheme may be better understood via a more specific consideration of the exemplary operation diagram 200 of FIG. 2.

A description of epoch $e_1$ of FIG. 2 follows. The output messages generated in epoch $e_1$ are buffered in buffer $b_1$ associated with epoch $e_1$. At the completion of epoch $e_1$, primary process $110_P$ sends the state update information $m_1$ to backup process $110_B$ (which, due to the propagation delay, is not received at backup process $110_B$ until near the end of the third epoch $e_3$). The backup process $110_B$ processes the state update information, which occurs from near the end of the third epoch $e_3$ to near the beginning of the fourth epoch $e_4$. The backup process $110_B$ sends a state update acknowledgment $a_1$ to primary process $110_P$ (which, due to the propagation delay, is not received at primary process $110_P$ until near the beginning of the sixth epoch $e_6$). The output messages buffered in buffer $b_1$ during epoch $e_1$ are then released to the environment 120 when state update acknowledgment $a_1$ is received during the sixth epoch $e_6$ (assuming buffers of previous epochs have been emptied). At this point, first epoch $e_1$ is no longer pending for primary process $110_P$.

A description of epoch $e_2$ of FIG. 2 follows. The output messages generated in epoch $e_2$ are buffered in buffer $b_2$ associated with epoch $e_2$. At the completion of epoch $e_2$, primary process $110_P$ sends the state update information $m_2$ to backup process $110_B$ (which, due to the propagation delay, is not received at backup process $110_B$ until near the end of the fourth epoch $e_4$). The backup process $110_B$ processes the state update information, which occurs from near the end of the fourth epoch $e_4$ to near the beginning of the fifth epoch $e_5$. The backup process $110_B$ sends a state update acknowledgment $a_2$ to primary process $110_P$ (which, due to the propagation delay, is not received at primary process $110_P$ until near the beginning of the seventh epoch $e_7$). The output messages buffered in buffer $b_2$ during epoch $e_2$ are then released to the environment 120 when state update acknowledgment $a_2$ is received during the seventh epoch $e_7$ (assuming buffers of previous epochs have been emptied). At this point, second epoch $e_2$ is no longer pending for primary process $110_P$. From second epoch $e_2$, it may be seen that the initiation of the next epoch (third epoch $e_3$) is independent of receipt of any state update acknowledgement from backup process $110_B$ indicating that backup process $110_B$ has received and applied associated state update information for any previous epoch (namely, epochs $e_0$, $e_1$, and e2), because third epoch $e_3$ is initiated before state update acknowledgment $a_1$ of epoch $e_1$ and update acknowledgment $a_2$ of epoch $e_2$ are received by the primary process $110_P$.

Figure 3:
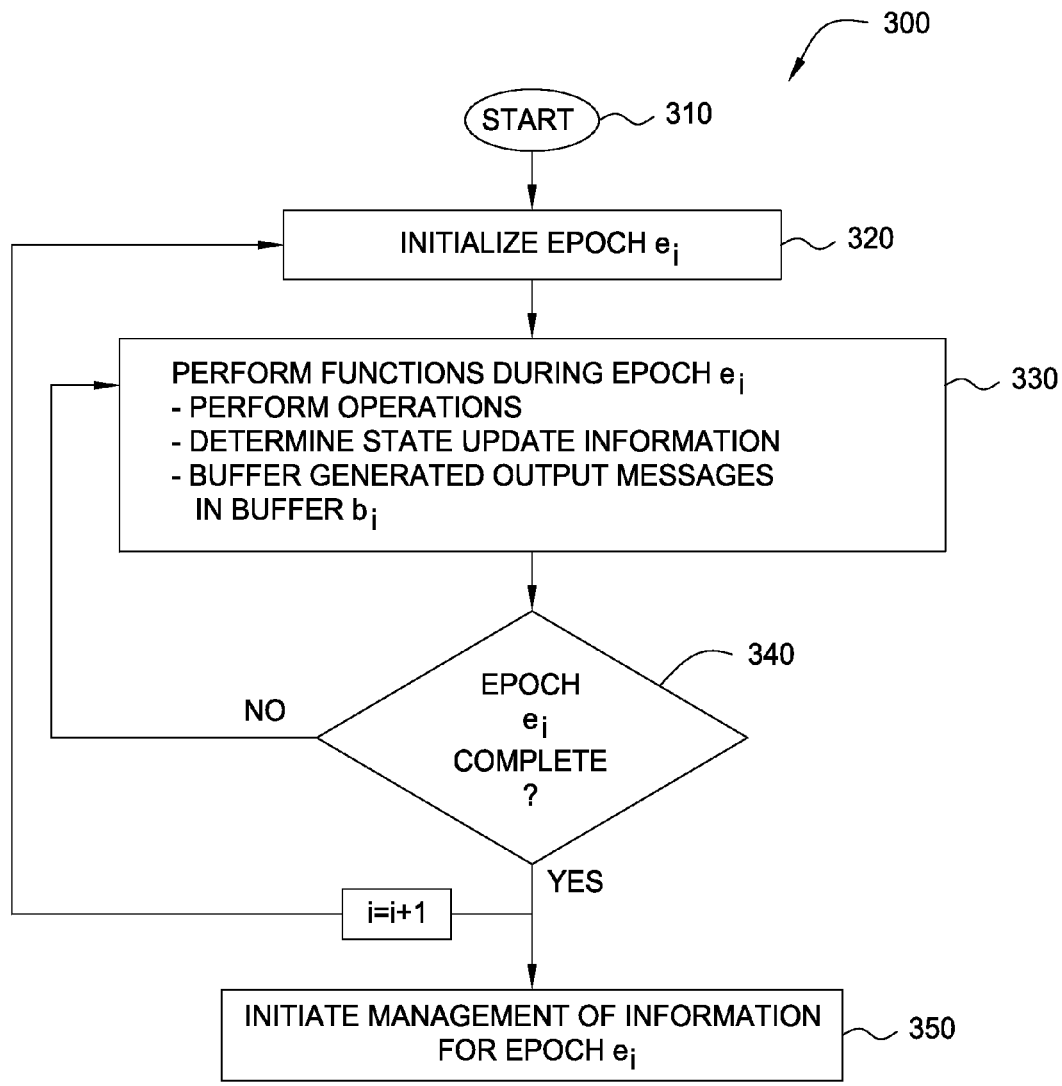
FIG. 3 depicts one embodiment of a method for providing primary-backup replication using epochs as depicted and described with respect to FIG. 2.

FIG. 3 depicts one embodiment of a method for providing primary-backup replication using epochs as depicted and described with respect to FIG. 2.

At step 310, method 300 begins.

At step 320, an epoch $e_i$ is initialized. The epoch $e_i$ has an associated buffer $b_i$ allocated for epoch $e_i$.

At step 330, the primary process performs functions during the epoch $e_i$. The primary process performs operations (at least some of which may result in changes to the state information of the primary process), computes state update information for the epoch $e_i$, and buffers generated output messages in the buffer $b_i$ associated with epoch $e_i$. It is noted that these functions may be performed at any suitable times within epoch $e_i$ (e.g., the state update information may be computed contemporaneous with and/or after the operations are performed, the output messages may be generated and buffered at any times throughout the epoch $e_i$, and the like, as well as various combinations thereof).

At step 340, method 300 determines whether the epoch $e_i$ is complete. The epoch $e_i$ may be considered to be complete at any time after the state update information for the epoch $e_i$ has been determined. If the epoch $e_i$ is not complete, method 300 returns to step 330 (i.e., the primary process continues to perform some or all of the functions (e.g., determining state update information for the epoch $e_i$, buffering generated output messages in the buffer $b_i$ associated with epoch $e_i$, and the like. If the epoch $e_i$ is complete, the method 300: (1) returns to step 320 to initiate the next epoch (i=i+1) and (2) proceeds to step 350. It is noted that, although the next epoch $e_{i+1}$ is initiated, the epoch $e_i$ remains pending for purposes of buffering the output messages generated during the epoch $e_i$ until those output messages can be released to the environment.

At step 350, the primary process initiates management of information associated with the epoch $e_i$. This may include sending of the state update information to the backup process and performing actions to control the release of output messages buffered in buffer $b_i$ associated with epoch $e_i$. An exemplary process for managing information associated with an epoch $e_i$ is depicted and described herein with respect to FIG. 4.

In FIG. 3, method 300 is configured such that, from step 340, method 300 returns to step 320 (for initialization of the next epoch $e_{i+1}$) and also proceeds to step 350 (for management of information associated with epoch $e_i$). This indicates that, for each execution of steps 320-340, there will be a separate execution of step 350. As such, at any given time, there will be a current execution of steps 320-340 for an epoch $e_i$ and one or more contemporaneous executions of step 350 for one or more previous epochs still pending at the time of the execution of steps 320-340 for epoch $e_i$.

Figure 4:
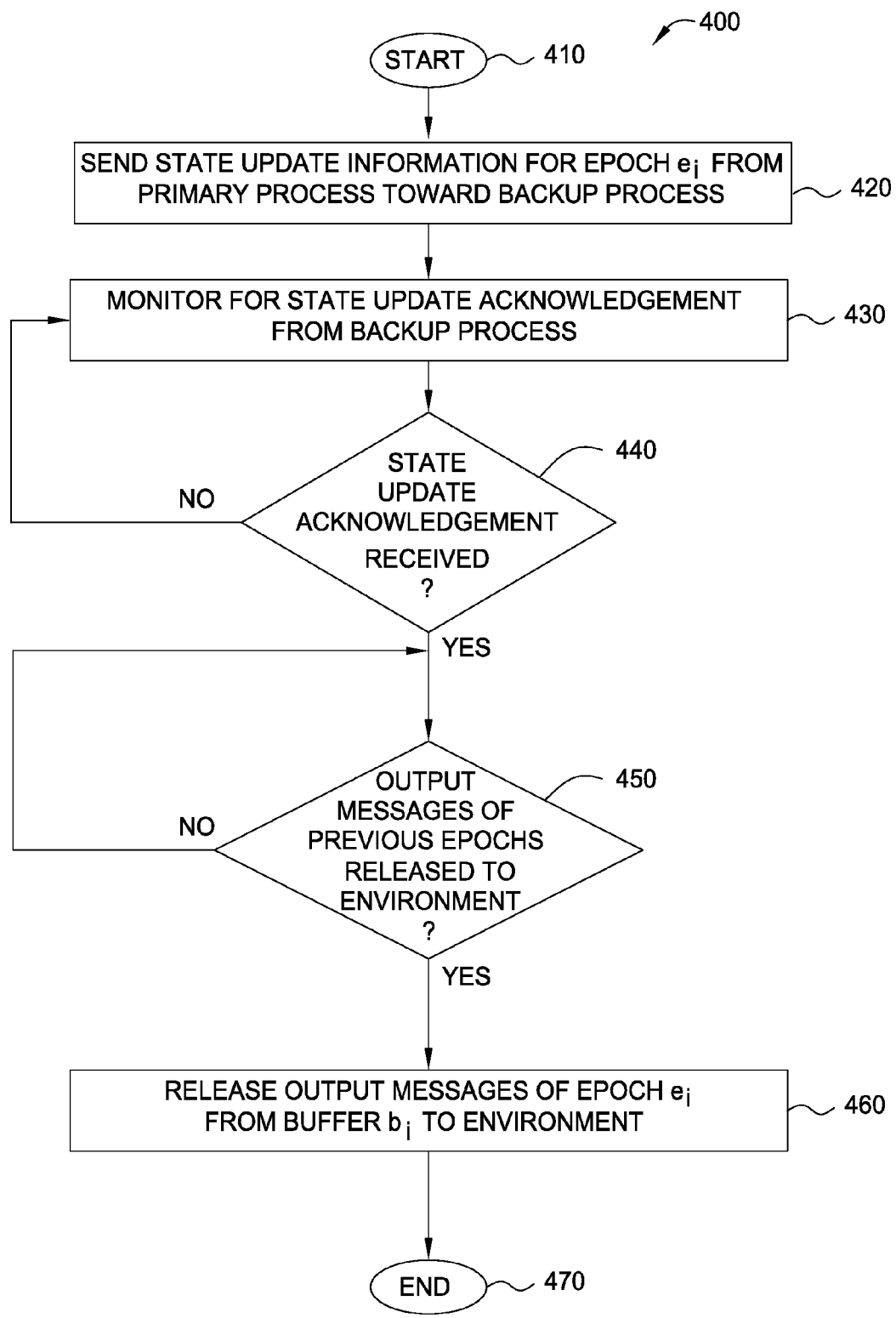
FIG. 4 depicts one embodiment of a method for providing primary-backup replication by managing information associated with the epochs as depicted and described with respect to FIG. 2.

FIG. 4 depicts one embodiment of a method for providing primary-backup replication by managing information associated with the epochs as depicted and described with respect to FIG. 2.

As noted above, method 400 of FIG. 4 is suitable for use as step 350 of method 300 of FIG. 3 for each epoch $e_i$ initialized by method 300 of FIG. 3.

At step 410, method 400 begins. It is assumed that, at this point, the state update information for epoch $e_i$ has been computed by the primary process (e.g., using steps 320-340 of method 300 of FIG. 3).

At step 420, the primary process sends the state update information for epoch $e_i$ toward the backup process.

At step 430, the primary process monitors for receipt of a state update acknowledgement for the epoch $e_i$ from the backup process.

At step 440, the primary process determines whether the state update acknowledgement of the epoch $e_i$ has been received. If the state update acknowledgement of the epoch $e_i$ has not been received, method 400 returns to step 430 (i.e., the primary process continues to monitor for receipt of the state update acknowledgement for the epoch $e_i$). If the state update acknowledgement of the epoch $e_i$ has been received, method 400 proceeds to step 450.

At step 450, the primary process determines whether all output messages of all previous epochs have been released to the environment. If all output messages of all previous epochs have not been released to the environment, method 400 remains at step 450 (i.e., the primary process waits until all output messages of all previous epochs have been released to the environment before proceeding with respect to the output messages of the buffer $b_i$ of the epoch $e_i$). If all output messages of all previous epochs have been released to the environment, the method 400 proceeds to step 460.

At step 460, the primary process releases the output messages of the buffer $b_i$ of the epoch $e_i$ to the environment.

At step 470, method 400 ends. As noted with respect to FIG. 3, the method 400 of FIG. 4 is repeated for each epoch initialized by method 300 of FIG. 3. Thus, it is expected that, at any given time, multiple executions of method 400 will be active concurrently with each other as well as with execution of method 300 of FIG. 3

As described hereinabove, it is noted that although method 300 of FIG. 3 and method 400 of FIG. 4 are depicted and described with respect to an embodiment in which the state update information for an epoch $e_i$ is sent from the primary process toward the backup process after the epoch $e_i$ is complete and a new epoch $e_{i+1}$ has been initiated, the state update information for epoch $e_i$ may be sent from the primary process toward the backup process at any other suitable time (e.g., within the epoch $e_i$ as part of step 330 (not depicted), after epoch $e_i$ as part of step 350 (as depicted in FIG. 4), or a combination thereof).

Although primarily depicted and described herein with respect to providing synchronization in a primary-backup replication scheme where the primary and backup elements are processes, it will be appreciated that the various embodiments depicted and described herein may be used to provide synchronization in a primary-backup replication scheme for other types of primary and backup elements (e.g., for synchronization between primary and backup devices (e.g., nodes of a network or other suitable types of devices), for synchronization between primary and backup applications, and the like.

Figure 5:
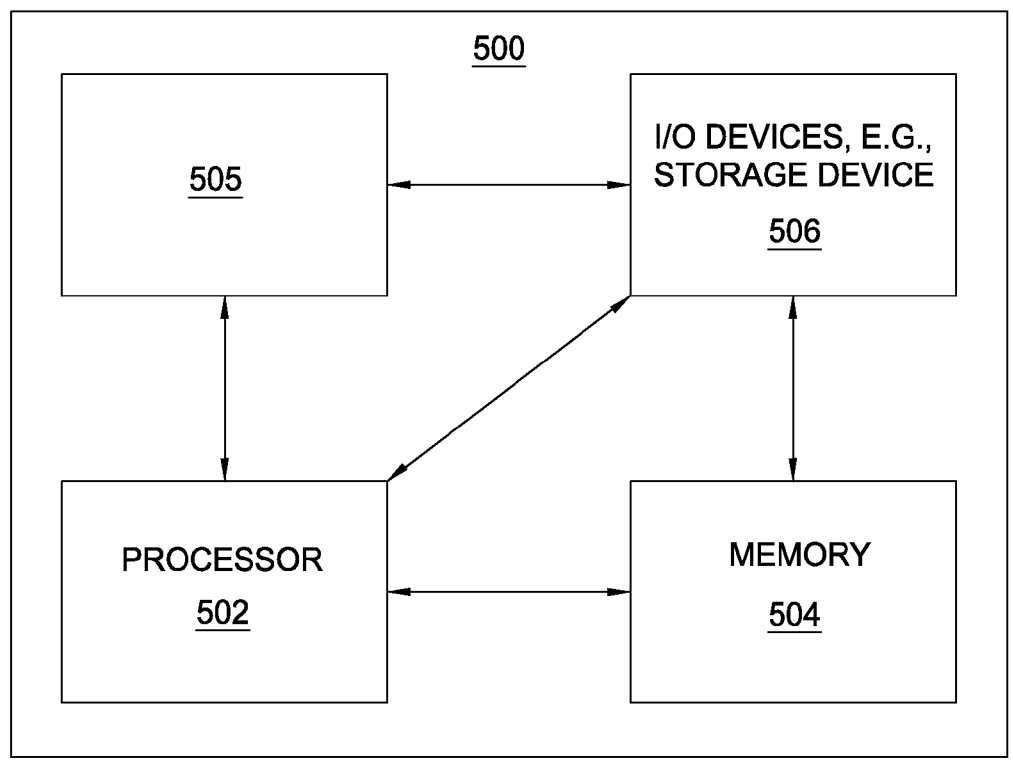
FIG. 5 depicts a high-level block diagram of a computer suitable for use in performing functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)) and a memory 504 (e.g., random access memory (RAM), read only memory (ROM), and the like). The computer 500 also may include a cooperating module/process 505 and/or various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 505 can be loaded into memory 504 and executed by the processor 502 to implement functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of primary process $110_P$, a device configured to host primary process $110_P$, backup process $110_B$, a device configured to host backup process $110_B$, devices of environment 120, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for synchronizing state between a primary process and a backup process, comprising:
at least one memory configured to maintain a plurality of output buffers associated with a respective plurality of epochs of a synchronization process configured to synchronize state information of the primary process with state information of the backup process; and
a processor communicatively connected to the at least one memory, the processor configured to:
compute state update information for a current epoch, the state update information representing changes to the state information of the primary process since a previous epoch;
buffer output messages generated during the current epoch in the output buffer associated with the current epoch;
initiate a new epoch independent of receiving, from the backup process, a state update acknowledgement for the current epoch acknowledging receipt by the backup process of the state update information for the current epoch; and
release the output messages generated during the current epoch from the output buffer associated with the current epoch based on a determination that the state update acknowledgment for the current epoch has been received from the backup process and a determination that output messages of any previous epochs have been released from the respective output buffers associated with the previous epochs.

2. The apparatus of claim 1, wherein the processor is configured to:
during the current epoch, receive input messages and process the input messages for generating at least a portion of the output messages generated during the current epoch.

3. The apparatus of claim 1, wherein the processor is configured to:
during the current epoch, perform local processing for generating at least a portion of the output messages generated during the current epoch.

4. The apparatus of claim 1, wherein the processor is configured to:
propagate the state update information associated with the current epoch toward the backup process.

5. The apparatus of claim 4, wherein the processor is configured to release the output messages generated during the current epoch an environment associated with the primary process and the backup process.

6. The apparatus of claim 5, wherein the environment comprises a communication network and at least one other process configured to communicate with the primary process.

7. The apparatus of claim 1, wherein the processor is configured to:
determine whether the state update acknowledgment for the current epoch has been received by monitoring for receipt, from the backup process, of the state update acknowledgment for the current epoch.

8. The apparatus of claim 1, wherein the processor is configured to:
determine whether output messages of any previous epochs have been released from the respective output buffers associated with the previous epochs based on a determination that the state update acknowledgment for the current epoch has been received.

9. The apparatus of claim 8, wherein the processor is configured to:
delay release of the output messages generated during the current epoch the output buffer associated with the current epoch based on a determination that not all of the output messages of any previous epochs have been released from the respective output buffers associated with the previous epochs.

10. A method for synchronizing state between a primary process and a backup process, the method comprising:
using a processor and at least one memory for:
computing state update information for a current epoch of a synchronization process configured to synchronize state information of a primary process with state information of a backup process, wherein the state update information represents changes to the state information of the primary process since a previous epoch;
buffering output messages generated during the current epoch in an output buffer associated with the current epoch;
initiating a new epoch independent of receiving, from the backup process, a state update acknowledgement for the current epoch acknowledging receipt by the backup process of the state update information for the current epoch; and
releasing the output messages generated during the current epoch from the output buffer associated with the current epoch based on a determination that the state update acknowledgment for the current epoch has been received from the backup process and a determination that output messages of any previous epochs have been released from the respective output buffers associated with the previous epochs.

11. The method of claim 10, further comprising:
during the current epoch, receiving input messages and processing the input messages for generating at least a portion of the output messages generated during the current epoch.

12. The method of claim 10, further comprising:
during the current epoch, performing local processing for generating at least a portion of the output messages generated during the current epoch.

13. The method of claim 10, further comprising:
propagating the state update information associated with the current epoch toward the backup process.

14. The method of claim 13, wherein the output messages generated for the current epoch are released to an environment associated with the primary process and the backup process.

15. The method of claim 14, wherein the environment comprises a communication network and at least one other process configured to communicate with the primary process.

16. The method of claim 10, further comprising:
determining whether the state update acknowledgment for the current epoch has been received by monitoring for receipt, from the backup process, of the state update acknowledgment for the current epoch.

17. The method of claim 10, further comprising:
determining whether output messages of any previous epochs have been released from the respective output buffers associated with the previous epochs based on a determination that the state update acknowledgment for the current epoch has been received.

18. The method of claim 17, further comprising:
delaying release of the output messages generated during the current epoch the output buffer associated with the current epoch based on a determination that not all of the output messages of any previous epochs have been released from the respective output buffers associated with the previous epochs.

19. A non-transitory computer-readable storage medium storing instructions which, when executed by a computer, cause the computer to perform a method for synchronization between a primary process and a backup process, the method comprising:
computing state update information for a current epoch of a synchronization process configured to synchronize state information of a primary process with state information of a backup process, wherein the state update information represents changes to the state information of the primary process since a previous epoch;
buffering output messages generated during the current epoch in an output buffer associated with the current epoch;
initiating a new epoch independent of receiving, from the backup process, a state update acknowledgement for the current epoch acknowledging receipt by the backup process of the state update information for the current epoch; and
releasing the output messages generated during the current epoch from the output buffer associated with the current epoch based on a determination that the state update acknowledgment for the current epoch has been received from the backup process and a determination that output messages of any previous epochs have been released from the respective output buffers associated with the previous epochs.

* * * * *